United States Patent
Röhm

[11] Patent Number: 6,095,530
[45] Date of Patent: Aug. 1, 2000

[54] DRILL CHUCK WITH METAL-REINFORCED PLASTIC BODY

[75] Inventor: Günter Horst Röhm, Sontheim, Germany

[73] Assignee: Rohm GmbH, Sontheim, Germany

[21] Appl. No.: 09/226,457

[22] Filed: Jan. 6, 1999

[30] Foreign Application Priority Data

Jan. 14, 1998 [DE] Germany .............................. 198 00 998

[51] Int. Cl.[7] ................................................... B23B 31/12
[52] U.S. Cl. .............................. 279/62; 279/158; 279/902
[58] Field of Search ............................... 279/60–65, 158, 279/902

[56] References Cited

U.S. PATENT DOCUMENTS

| | | | |
|---|---|---|---|
| 3,910,589 | 10/1975 | Derbyshire ............................... | 279/158 |
| 4,995,444 | 2/1991 | Jolly et al. ................................ | 164/97 |
| 5,108,678 | 4/1992 | Hirasaka et al. ........................ | 264/113 |
| 5,390,940 | 2/1995 | Morlino et al. .......................... | 279/62 |

FOREIGN PATENT DOCUMENTS

| | | | |
|---|---|---|---|
| 2041798 | 9/1980 | United Kingdom ..................... | 279/64 |

*Primary Examiner*—Steven C. Bishop
*Attorney, Agent, or Firm*—Herbert Dubno; Andrew Wilford

[57] ABSTRACT

A drill chuck has a body centered on and rotatable about an axis and formed centered on the axis with a rearwardly open spindle hole, a forwardly open tool hole, and a plurality of angled guide passages opening axially forward into the tool hole. Respective jaws axially and radially displaceable in the guide passages are each formed with a row of teeth in mesh with an internal thread of a metallic tightening ring axially fixed but rotatable about the axis on the body. Thus rotation of the tightening ring displaces the jaws in their guide passages. The body is formed of plastic and includes an imbedded metallic reinforcement element which has a frustoconical portion forming outside walls of the guide passages and the jaws ride directly on the metallic element. Furthermore the body is formed with a radially outwardly open groove receiving the tightening ring and having axially confronting inner and outer flanks and the metallic element has a radially outwardly directed substantially planar flange at the outer flank of the groove.

15 Claims, 5 Drawing Sheets

DRILL CHUCK WITH METAL-REINFORCED PLASTIC BODY

FIELD OF THE INVENTION

The present invention relates to a drill chuck.

BACKGROUND OF THE INVENTION

In my commonly owned U.S. Pat. No. 5,829,761 issued Nov. 3, 1998 I describe a drill chuck having a metal body centered on and rotatable about an axis and formed with a plurality of angled guides opening axially forward at a front chuck end and holding respective radially displaceable jaws each formed with a row of teeth. A metallic inner ring axially fixed but rotatable about the axis on the body has a screwthread meshing with the teeth so that rotation of the inner ring displaces the jaws in their guides. An adjustment sleeve rotatable about the axis on the body has a hard outer part and an inner part of a softer material fixed on the outer part. A metallic intermediate ring fixed on the inner ring has formations coupled to the hard outer part. The inner part rides on the intermediate ring.

The chuck body is made of metal and is relatively difficult to manufacture. It various formations must be individually formed and in some cases threaded. Since the guide passages for the jaws are at an angle to the central axis, they must be individually bored out. Thus this part of the chuck is fairly expensive.

OBJECTS OF THE INVENTION

It is therefore an object of the present invention to provide an improved drill chuck.

Another object is the provision of such an improved drill chuck which overcomes the above-given disadvantages, that is which is inexpensive to manufacture but as durable as the prior-art such chucks.

SUMMARY OF THE INVENTION

A standard drill chuck has a body centered on and rotatable about an axis and formed centered on the axis with a rearwardly open spindle hole, a forwardly open tool hole, and a plurality of angled guide passages opening axially forward into the tool hole. Respective jaws axially and radially displaceable in the guide passages are each formed with a row of teeth in mesh with an internal thread of a metallic tightening ring axially fixed but rotatable about the axis on the body. Thus as is known per se rotation of the tightening ring displaces the jaws in their guide passages. In accordance with the invention the body is formed of plastic and includes an imbedded metallic reinforcement element. More particularly the metallic element has a frustoconical portion forming outside walls of the guide passages and the jaws ride directly on the metallic element. Furthermore the body is formed with a radially outwardly open groove receiving the tightening ring and having axially confronting inner and outer flanks and the metallic element has a radially outwardly directed substantially planar flange at the outer flank of the groove.

Thus with this arrangement the main part of the chuck body is made of an easily shaped synthetic-resin body that can be made with a fairly complex shape simply by molding, with no expensive machining operations. It is lined at its critical points of wear with metal. According to the invention the metallic element is formed with an axially forwardly directed substantially cylindrical collar lining the tool hole. To ensure that the element is solidly coupled to the plastic part of the body, it is formed with radially throughgoing apertures through which plastic of the body extends. Such coupling is further enhanced when the metallic element is corrugated.

The metallic element can include a sleeve having the frustoconical portion and a reinforcement ring forming the flange and having a collar lining the spindle hole. This ring can have radially extending fingers forming the flange. The reinforcement ring and sleeve can be unitary with each other. Alternately the sleeve can be formed with fingers engaging bayonet-fashion through the reinforcement ring. In this latter arrangement the fingers have bent-over ends and the reinforcement ring is formed with apertures through which the fingers engage. For further reinforcement the flange forms the outer flank of the groove.

The plastic in accordance with the invention is reinforced with fibers, normally of glass and/or carbon. Between 10% and 25% glass fibers and 5% and 15% carbon fibers are used, and the fibers are nonuniformly distributed in the plastic so as to reinforce the locations subjected to the most stress.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
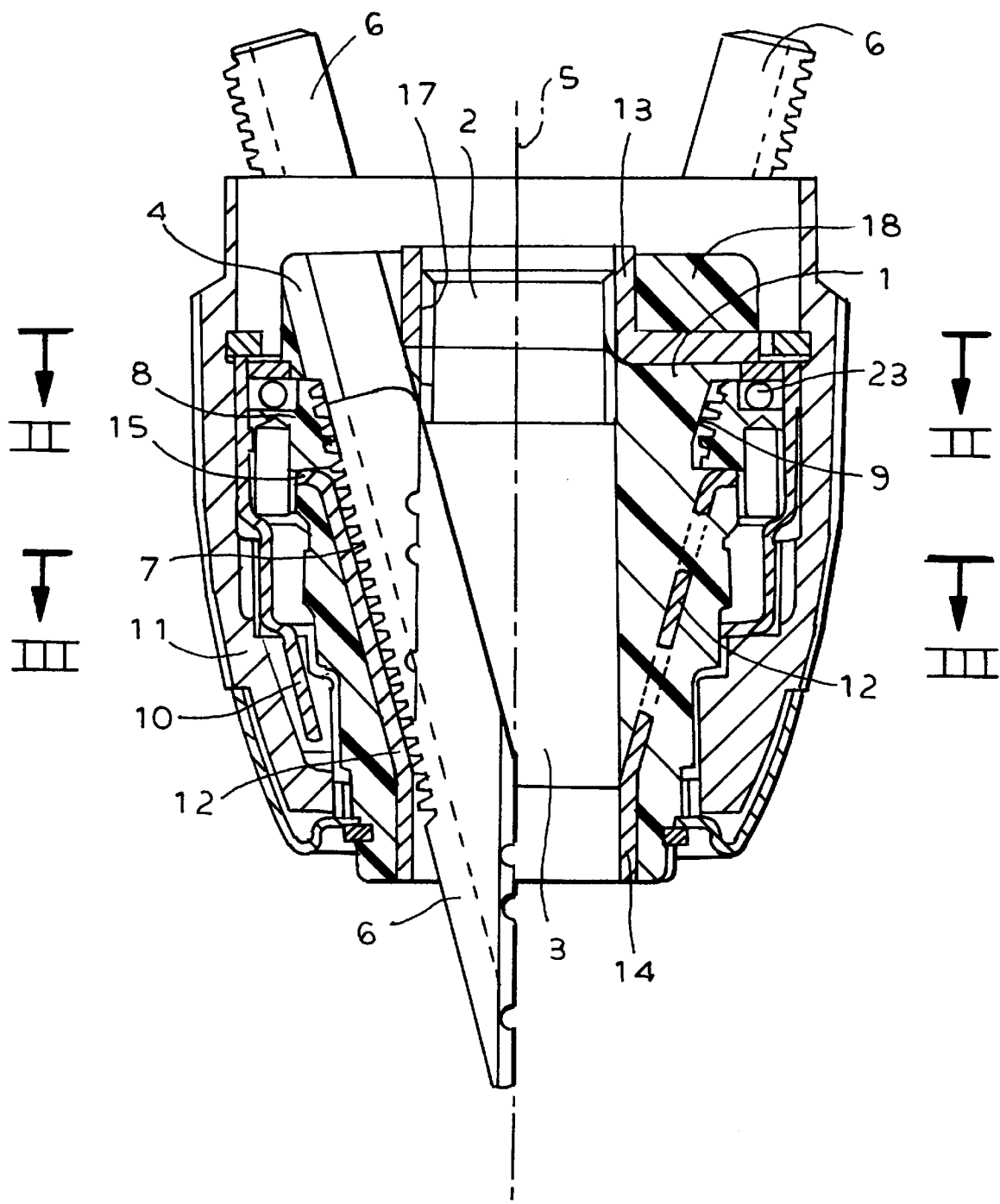
FIG. 1 is an axial section through a chuck according to the invention.
Figure 2:
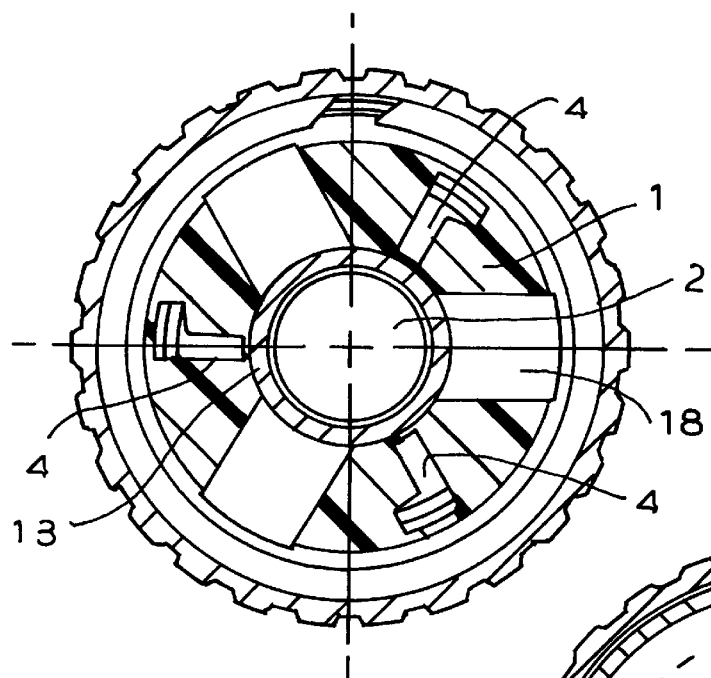
FIGS. 2 and 3 are sections taken along respective lines II—II and III—III of FIG. 1.
Figure 3:
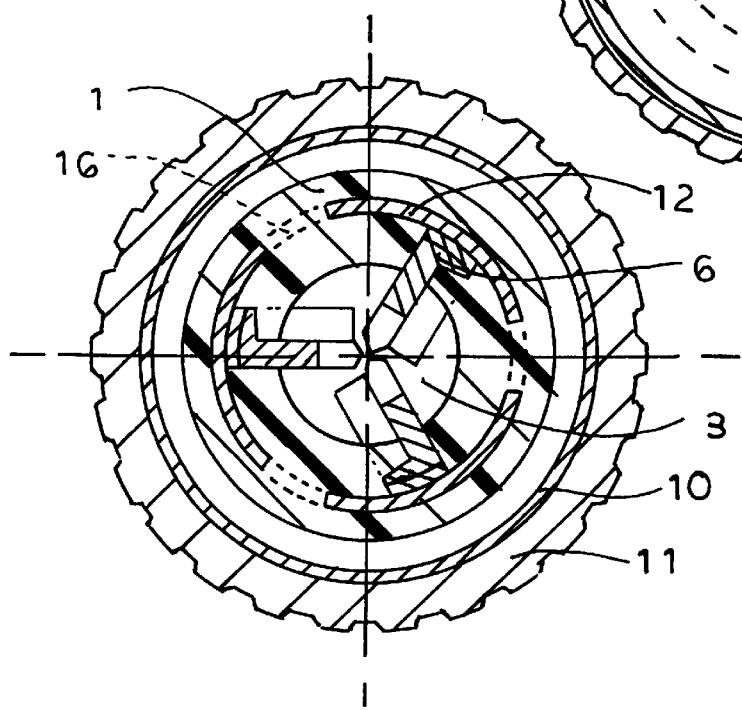

As seen in FIGS. 1 through 3, a chuck according to the invention has a body 1 centered on an axis 5 and formed with a rearwardly open threaded hole 2 adapted to fit a spindle of a power unit, and a forwardly open tool receiving hole 3, both also centered on the axis 5. Three angularly equispaced and inclined guide passages 4 in the body 1 hold respective steel jaws 6 having toothed rear edges 7 engaged by an internal screwthread of a metal ring 8 seated in a radially outwardly open square-section groove 9 formed in the body 1. A stepped metallic intermediate sleeve 10 connects the ring 8 to an outer plastic adjustment sleeve 11 that extends substantially the full axial length of the chuck. As is normal, rotation of the ring 8 about the axis 4 in one direction moves the jaws 6 axially forward (down in FIG. 1) and radially together and opposite rotation moves them axially backward and radially apart so as to clamp and declamp a tool in the hole 3.

According to the invention the body 1 is formed of a fiber-reinforced durable polyamide. Normally between 10% and 25% of glass fibers, preferably 20%, and between 5% and 15% of carbon fibers, preferably 10%, are used. The distribution of the fibers in the body can be varied, being concentrated at high-stress locations such as around the front end. Such a body 1 can be made by molding which allows it to assume a more complex shape than can be produced by machining.

Further in accordance with the invention the body 1 is reinforced with metal. More particularly a frustoconical metal sleeve 12 with a cylindrical front end 14 and a planar radially outwardly projecting rear flange 15 is imbedded in the body 1. The cylindrical front end 14 lines the tool recess 3 while the body or central main part of the sleeve 12 lies on the outer surfaces of the guides 4 on which the toothed edges of the jaws 6 ride, preventing the teeth 7 from eroding the body 1. The rear flange 15 forms the front flank of the groove 9 so that the ring 8 will not bit into the softer body 1. In addition the central part of the sleeve 12 is formed with radially throughgoing holes 16 (see FIG. 3) through which the plastic of the body 1 passes to solidly unite these two parts.

Another metal sleeve or ring 13 is imbedded in the rear part of this body 1, and in fact is formed with a screwthread 17 into which the unillustrated spindle of the power unit is threaded. This body 13 has radially outwardly projecting fingers 18 (see FIG. 2) that are imbedded in the plastic body 1 and that buttress a rear race of a bearing 23 on which the ring 8 rides.

Figure 5:
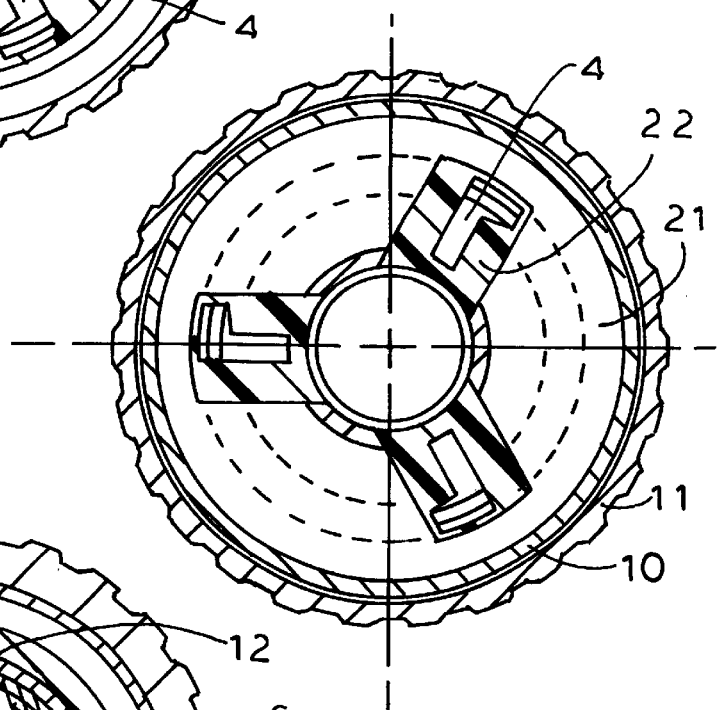
FIGS. 5 and 6 are sections taken along respective lines V—V and VI—VI of FIG. 4.
Figure 4:
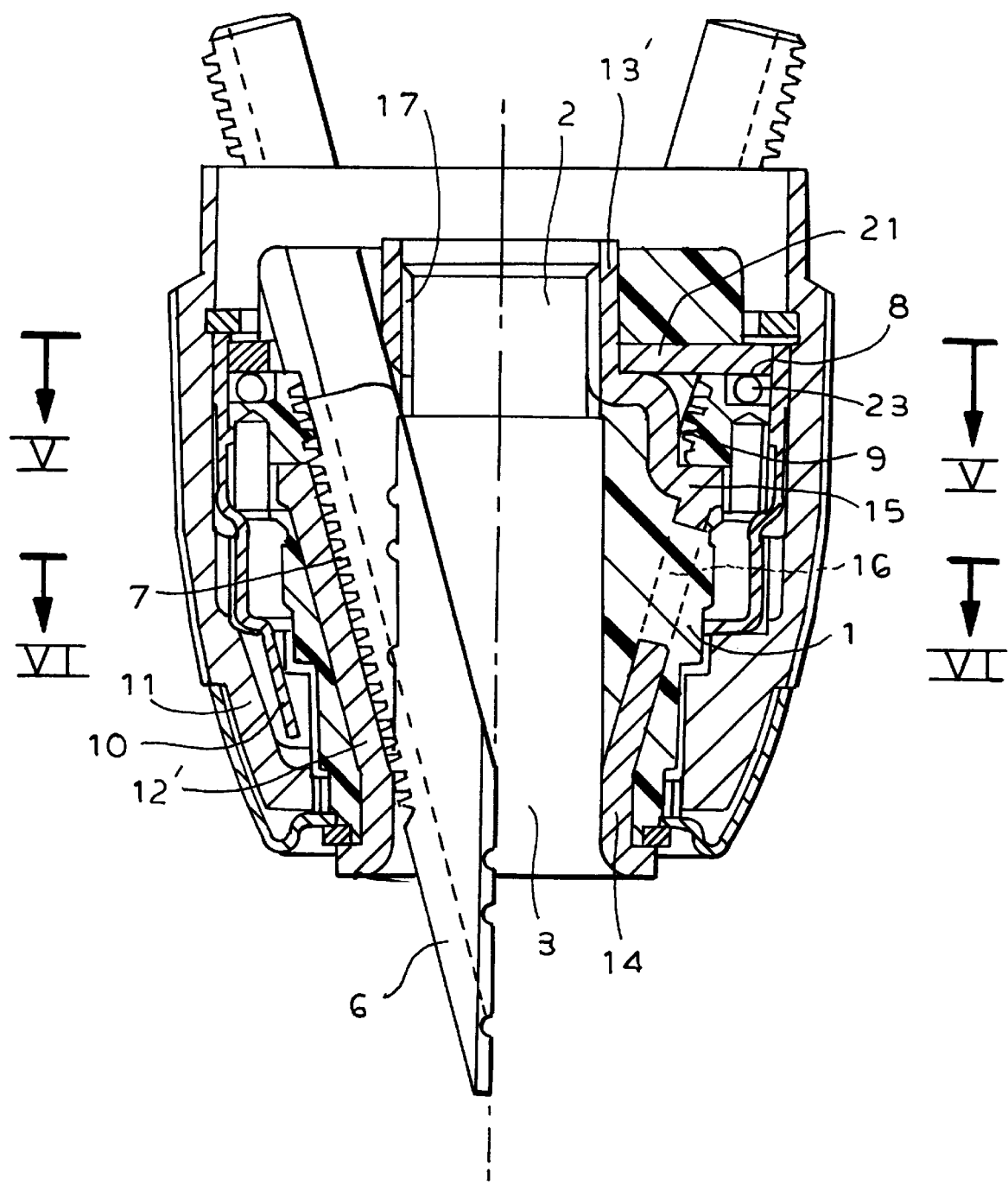
FIG. 4 is an axial section through another chuck according to the invention.
Figure 6:
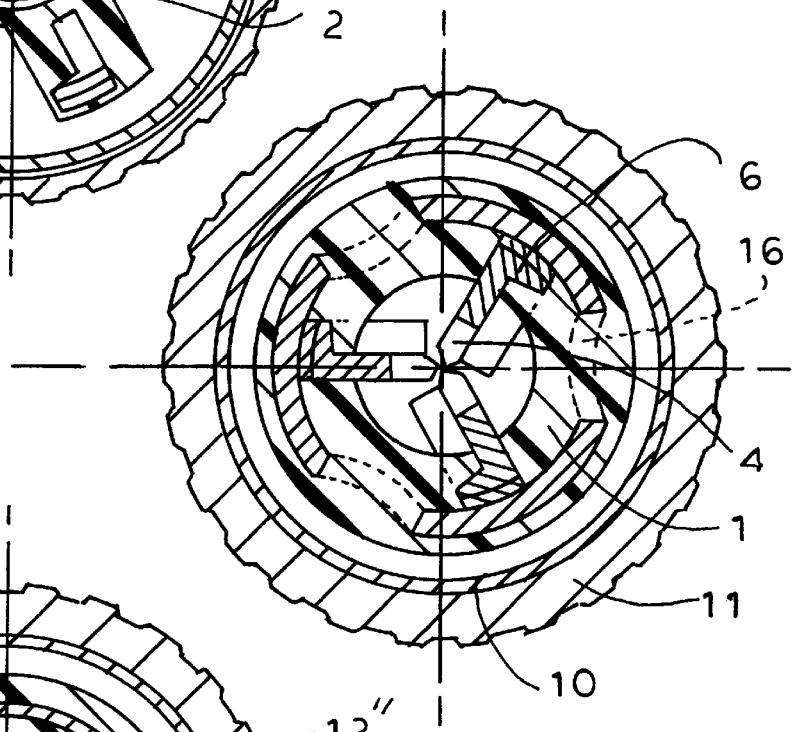

The chuck of FIGS. 4 through 6 is identical to that of FIG. 1 except that the sleeve 12' is bowed inward level with the recesses 16, giving it a somewhat corrugated shape. In addition its rear end is unitarily formed with the rear ring 13' and a separate flat ring 21 fixed to a step in the combined metal sleeve 12', 13' directly forms the rear race of the bearing 23.

Figure 8:
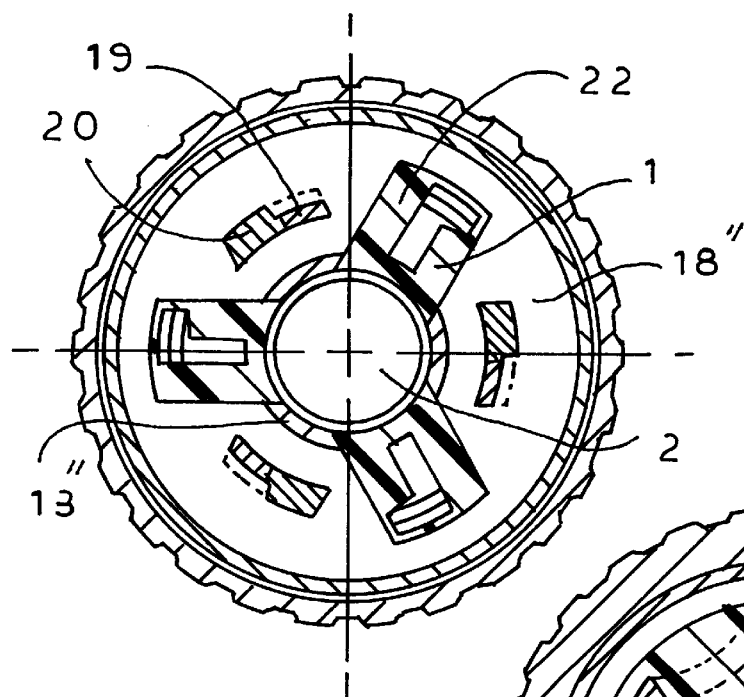
FIGS. 8 and 9 are sections taken along respective lines VIII—VIII and IX—IX of FIG. 7.
Figure 9:
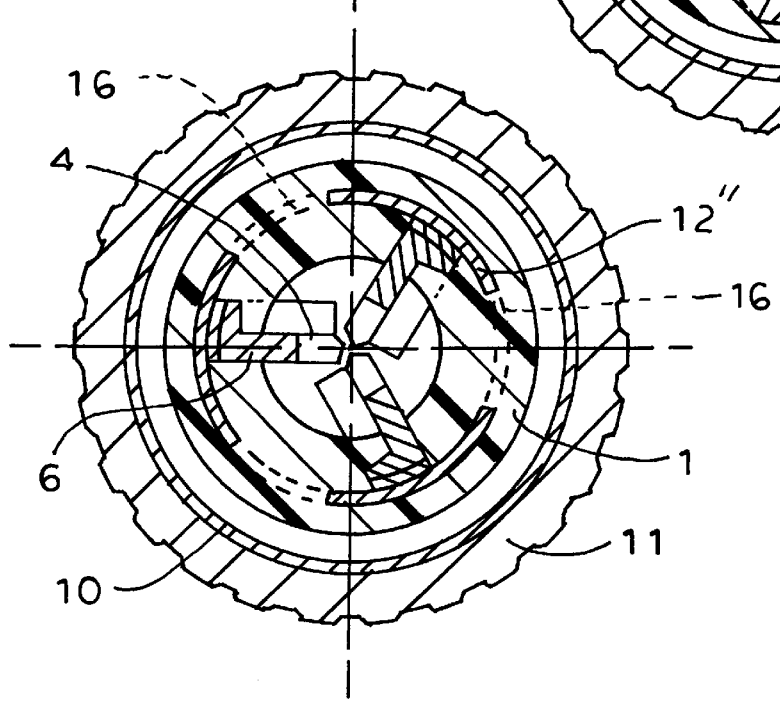
Figure 7:
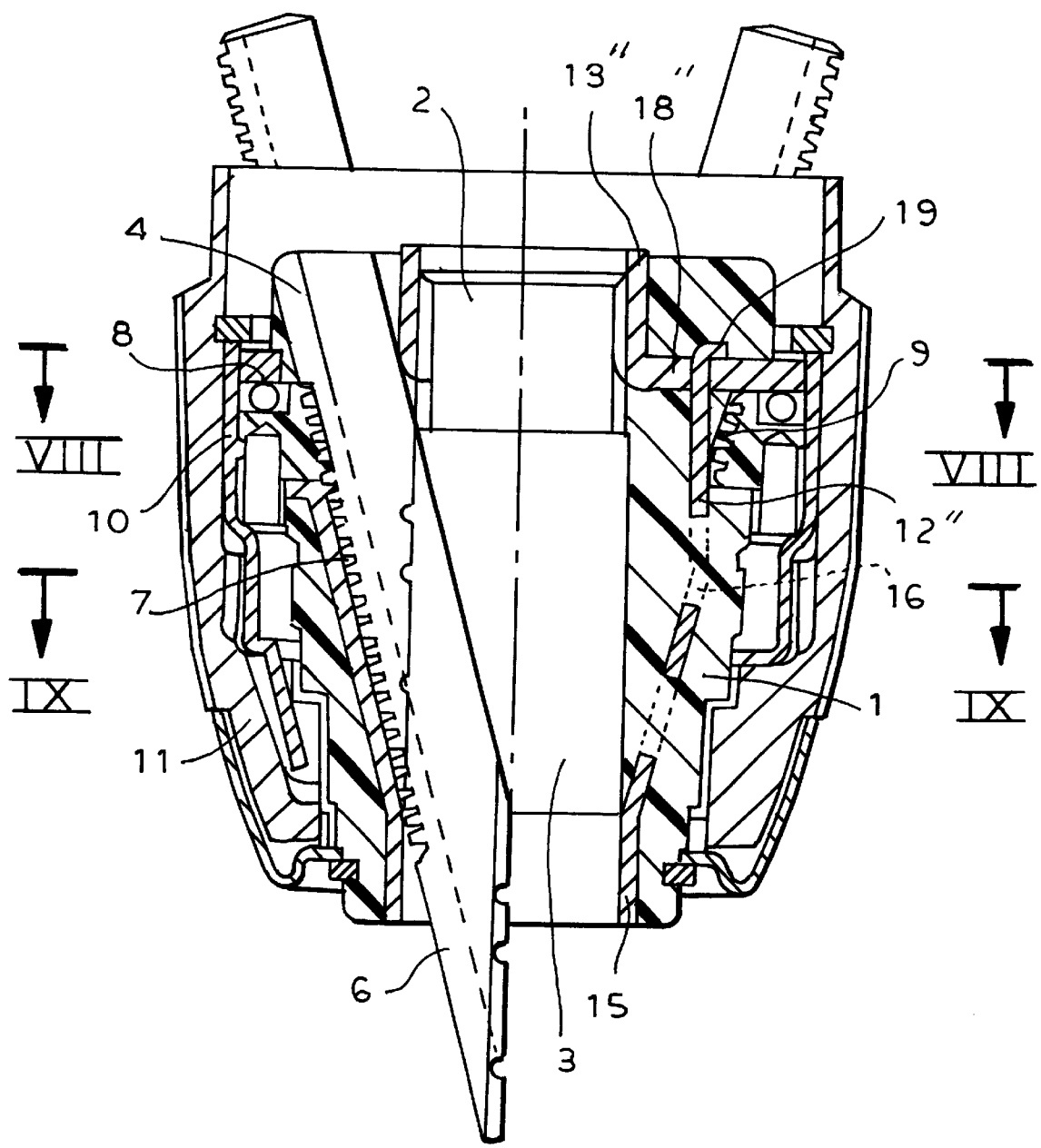
FIG. 7 is an axial section through yet another chuck in accordance with the invention.

In FIGS. 7 through 9 the sleeve 12" is formed with rearwardly projecting fingers 19 with bent-over ends that engage through slots 20 of the rear ring 13", forming a bayonet joint. The slots 20 have ends wide enough to pass the bent-over ends and opposite narrower ends, so when the fingers 19 are pushed through them and the two parts 12" and 13" are relatively twisted, they are locked together. Here also the ring 13" is formed with an annularly continuous flange 18" formed with holes 22 through which the plastic of the body 1 can engage.

I claim:

1. In a drill chuck having:
    a body centered on and rotatable about an axis and formed centered on the axis with
        a rearwardly open spindle hole,
        a forwardly open tool hole,
        a radially outwardly open groove having axially confronting inner and outer flanks, and
        a plurality of angled guide passages opening axially forward into the tool hole;
    respective jaws axially and radially displaceable in the guide passages and each formed with a row of teeth;
    a metallic tightening ring received in the groove, axially fixed but rotatable about the axis on the body, and having a screwthread meshing with the teeth, whereby rotation of the tightening ring displaces the jaws in their guide passages; the improvement wherein
    the body is formed of plastic and includes an imbedded metallic reinforcement element having a frustoconical portion forming outside walls of the guide passages and a radially outwardly directed substantially planar flange at the outer flank of the groove, the jaws riding directly on the metallic element.

2. The drill chuck defined in claim 1 wherein the metallic element is formed with an axially forwardly directed substantially cylindrical collar lining the tool hole.

3. The drill chuck defined in claim 1 wherein the metallic element is formed with radially throughgoing apertures through which plastic of the body extends.

4. The drill chuck defined in claim 1 wherein the metallic element is corrugated.

5. The drill chuck defined in claim 1 wherein the metallic element includes a sleeve having the frustoconical portion and a reinforcement ring forming the flange and having a collar lining the spindle hole.

6. The drill chuck defined in claim 5 wherein the reinforcement ring has radially extending fingers forming the flange.

7. The drill chuck defined in claim 5 wherein the reinforcement ring and sleeve are unitary with each other.

8. The drill chuck defined in claim 5 wherein the sleeve is formed with fingers engaging bayonet-fashion through the reinforcement ring.

9. The drill chuck defined in claim 8 wherein the fingers have bent-over ends and the reinforcement ring is formed with apertures through which the fingers engage.

10. The drill chuck defined in claim 1 wherein the flange forms the outer flank of the groove.

11. The drill chuck defined in claim 1 wherein the plastic is reinforced with fibers.

12. The drill chuck defined in claim 11 wherein the fibers are of glass or carbon.

13. The drill chuck defined in claim 11 wherein the plastic has between 10% and 25% glass fibers.

14. The drill chuck defined in claim 11 wherein the plastic has between 5% and 15% carbon fibers.

15. The drill chuck defined in claim 11 wherein the fibers are nonuniformly distributed in the plastic.

* * * * *